(12) United States Patent
Breitweiser et al.

(10) Patent No.: US 11,615,437 B2
(45) Date of Patent: *Mar. 28, 2023

(54) METHODS AND SYSTEMS FOR REWARDING PERSONAL WELL-BEING

(71) Applicant: STATE FARM MUTUAL AUTOMOBILE INSURANCE COMPANY, Bloomington, IL (US)

(72) Inventors: Edward W. Breitweiser, Bloomington, IL (US); Larry Ingrum, Mahomet, IL (US); Jennifer L. Crawford, Normal, IL (US); Jason W. Boice, Normal, IL (US); Jeffrey G. Christianson, Lexington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,446

(22) Filed: Feb. 2, 2022

(65) Prior Publication Data

US 2022/0156780 A1   May 19, 2022

Related U.S. Application Data

(63) Continuation of application No. 17/082,818, filed on Oct. 28, 2020, now Pat. No. 11,270,331.

(Continued)

(51) Int. Cl.
*G06Q 30/00* (2012.01)
*G06Q 30/0207* (2023.01)
(Continued)

(52) U.S. Cl.
CPC ..... *G06Q 30/0236* (2013.01); *G06Q 30/0226* (2013.01); *G06Q 40/08* (2013.01)

(58) Field of Classification Search
CPC . G06Q 30/0236; G06Q 30/0226; G06Q 40/08
See application file for complete search history.

(56) References Cited

U.S. PATENT DOCUMENTS

| 8,930,204 B1 | 1/2015 | Igoe et al. |
| 10,223,754 B1 | 3/2019 | Lopez et al. |

(Continued)

OTHER PUBLICATIONS

Set Some Goals to Live Your Life to the Fullest, Jul. 21, 2015, Standard Times (Year: 2015).*

(Continued)

*Primary Examiner* — Matthew L Hamilton
(74) *Attorney, Agent, or Firm* — Faegre Drinker Biddle & Reath

(57) ABSTRACT

A method and system of providing personalized rewards for lifestyle management of a user includes receiving various target goals from the user. The target goals relate to the personal health, community involvement and financial planning of the user. As such, the method and system include receiving and analyzing a first set of data during a first period of time to determine whether the user has met the target goals during the first period of time. In response to determining that the user has met the target goals, the method and system include receiving and analyzing a second set of data during a second period of time to determine whether the user has maintained the target goals during the second period of time. In response to determining that the user has maintained the target goals, the method and system include determining and transmitting one or more personalized rewards to the user.

20 Claims, 6 Drawing Sheets

Related U.S. Application Data

(60) Provisional application No. 62/993,272, filed on Mar. 23, 2020, provisional application No. 62/927,172, filed on Oct. 29, 2019.

(51) Int. Cl.
*G06Q 40/08* (2012.01)
*G06Q 30/0226* (2023.01)

(56) References Cited

U.S. PATENT DOCUMENTS

| | | |
|---|---|---|
| 10,841,380 B1 | 11/2020 | Gertz et al. |
| 2011/0082007 A1 | 4/2011 | Birrell et al. |
| 2012/0316933 A1 | 12/2012 | Pentland et al. |
| 2013/0054314 A1 | 2/2013 | Ross et al. |
| 2013/0060617 A1 | 3/2013 | Ross et al. |
| 2014/0032234 A1 | 1/2014 | Anderson |
| 2014/0067634 A1 | 3/2014 | Sowder et al. |
| 2014/0067712 A1 | 3/2014 | Prasad et al. |
| 2015/0170115 A1 | 6/2015 | Lacek |
| 2015/0213472 A1 | 7/2015 | Raikula |
| 2015/0317726 A1 | 11/2015 | Benartzi |
| 2016/0321935 A1 | 11/2016 | Mohler et al. |

OTHER PUBLICATIONS

The Money Bus Helps Kids Learn How to Manage Finances, Mar. 18, 2020 (Year: 2020), Palladium.

\* cited by examiner

```
┌──────────────────────────────────────────────────────────────────────┐
│ Receive a target health goal, a target community goal, and a target  │──202
│                  financial goal from a user                          │
└──────────────────────────────────────────────────────────────────────┘
                                    │
                                    ▼
┌──────────────────────────────────────────────────────────────────────┐
│ Receive a first set of data during a first period of time, the first │
│ set of data including a first health data indicating a current       │──204
│ personal health level for the user, a first community data           │
│ indicating a current community activity level for the user, and a    │
│ first financial data indicating a current financial independence     │
│ level for the user                                                   │
└──────────────────────────────────────────────────────────────────────┘
                                    │
                                    ▼
┌──────────────────────────────────────────────────────────────────────┐
│ Analyze the first set of data to determine whether: i) the target    │
│ health goal has been met during the first period of time based on    │
│ the first health data, ii) whether the target community goal has     │──206
│ been met during the first period of time based on the first          │
│ community data, and iii) whether the target financial goal has been  │
│ met during the first period of time based on the first financial     │
│ data                                                                 │
└──────────────────────────────────────────────────────────────────────┘
                                    │
                                    ▼
┌──────────────────────────────────────────────────────────────────────┐
│ In response to determining that the target health goal, the target   │
│ community goal and the target financial goal have been met during    │
│ the first period of time, receive a second set of data during a      │
│ second period of time, the second set of data including a second     │──208
│ health data indicating a continued personal health level for the     │
│ user, a second community data indicating a continued community       │
│ activity level for the user, and a second financial data indicating  │
│ a continued financial independence level for the user                │
└──────────────────────────────────────────────────────────────────────┘
                                    │
                                    ▼
┌──────────────────────────────────────────────────────────────────────┐
│ Analyze the second set of data to determine whether: i) the target   │
│ health goal has been maintained during the second period of time     │
│ based on the second health data, ii) whether the target community    │──210
│ goal has been maintained during the second period of time based on   │
│ the second community data, and iii) whether the target financial     │
│ goal has been maintained during the second period of time based on   │
│ the second financial data                                            │
└──────────────────────────────────────────────────────────────────────┘
                                    │
                                    ▼
┌──────────────────────────────────────────────────────────────────────┐
│ In response to determining that the target health goal, the target   │
│ community goal and the target financial goal have been maintained    │──212
│ during the second period of time, determine one or more personalized │
│ rewards for the user                                                 │
└──────────────────────────────────────────────────────────────────────┘
                                    │
                                    ▼
┌──────────────────────────────────────────────────────────────────────┐
│ transmit information indicating the one or more personalized rewards │──214
│ to the user                                                          │
└──────────────────────────────────────────────────────────────────────┘
```

FIG. 2

METHODS AND SYSTEMS FOR REWARDING PERSONAL WELL-BEING

CROSS-REFERENCE TO RELATED APPLICATIONS

The present application is a continuation of U.S. patent application Ser. No. 17/082,818, filed Oct. 28, 2020, which claims priority to and the benefit of U.S. Provisional Application No. 62/927,172, filed Oct. 29, 2019, and U.S. Provisional Application No. 62/993,272, filed Mar. 23, 2020, the subject matters of which are expressly incorporated herein by reference.

FIELD OF THE DISCLOSURE

The present disclosure generally relates to lifestyle management, and more particularly to methods and systems for providing personalized rewards based upon an individual's health status, community involvement, and/or financial planning.

BACKGROUND OF THE DISCLOSURE

Mobile and wearable devices have become ubiquitous in today's world. These devices enable individuals to monitor various aspects of their lives such as their health, wealth, social interactions, etc. However, these devices are primarily focused on providing individuals with the ability to track their personal activities or data. Individuals still lack adequate information on how to better manage the various aspects of their lives in view of such personal activities or data. Conventional techniques may have other drawbacks as well.

SUMMARY

The present embodiments facilitate allowing individuals to improve the management of their lives based upon the tracking of their personal activities and/or data. According to one embodiment, the present disclosure provides a computer-implemented method implemented by a server (and/or one or more processors, transceivers, and sensors) to provide personalized rewards for lifestyle management based upon the well-being of a user. The method may include, via one or more remote or local processors, servers, sensors, and/or transceivers, (1) receiving a target health goal, a target community goal, and/or a target financial goal from a plurality of devices associated with the user; and (2) receiving a first set of data during a first period of time from the plurality of devices associated with the user. The first set of data may include a first health data set indicating a current personal health level for the user, a first community data set indicating a current community activity level for the user, and a first financial data set indicating a current financial independence level for the user. The method may include, via one or more remote or local processors, servers, sensors, and/or transceivers, (3) analyzing the first set of data to determine whether: (i) the target health goal has been met during the first period of time based upon the first health data set, (ii) whether the target community goal has been met during the first period of time based upon the first community data set, and/or (iii) whether the target financial goal has been met during the first period of time based upon the first financial data set.

In response to determining that the target health goal, the target community goal and the target financial goal have been met during the first period of time, the method may include, via the one or more remote or local processors, servers, sensors, and/or transceivers, (4) receiving a second set of data during a second period of time from the plurality of devices associated with the user. The second set of data may include a second health data set indicating a continued personal health level for the user, a second community data set indicating a continued community activity level for the user, and a second financial data set indicating a continued financial independence level for the user. The method may further include, via the one or more remote or local processors, servers, sensors, and/or transceivers, (5) analyzing the second set of data to determine whether: (a) the target health goal has been maintained during the second period of time based upon the second health data, (b) whether the target community goal has been maintained during the second period of time based upon the second community data, and (c) whether the target financial goal has been maintained during the second period of time based upon the second financial data. In response to determining that the target health goal, the target community goal and the target financial goal have been maintained during the second period of time, the method may include, via the one or more remote or local processors, servers, sensors, and/or transceivers, (6) determining one or more personalized rewards for the user and transmits information indicating the one or more personalized rewards to the plurality of devices associated with the user. The method may include additional, less, or alternate actions, including those discussed elsewhere herein.

For instance, in a further aspect, the method may include, via one or more remote or local processors, servers, sensors, and/or transceivers, determining whether the target health goal has been met by determining whether the current personal health level is equal to or greater than a desired personal health level during the first period of time; and/or determining whether the target health goal has been maintained by determining whether the continued personal health level is equal to or greater than the current personal health level during the second period of time.

Similarly, the method may include, via one or more remote or local processors, servers, sensors, and/or transceivers, determining whether the target community goal has been met by determining whether the current community activity level is equal to or greater than a desired community activity level during the first period of time. Also, the method may include, via one or more remote or local processors, servers, sensors, and/or transceivers, determining whether the target community goal has been maintained by determining whether the continued community activity level is equal to or greater than the current community activity level during the second period of time.

Likewise, the method may include, via one or more remote or local processors, servers, sensors, and/or transceivers, determining whether the target financial goal has been met by determining whether the current financial independence level is equal to or greater than a desired financial independence level during the first period of time. The method may include, via one or more remote or local processors, servers, sensors, and/or transceivers, determining whether the target financial goal has been maintained by determining whether the continued financial independence level is equal to or greater than the current financial independence level during the second period of time.

In another aspect, the method may include, via one or more remote or local processors, servers, sensors, and/or transceivers, determining the one or more personalized rewards by accumulating reward points when the target health goal, the target community goal and the target financial goal have been met during the first period of time. Additional reward points are accumulated when the target health goal, the target community goal and the target financial goal have been maintained during the second period of time.

The method may include, via one or more remote or local processors, servers, sensors, and/or transceivers, determining the one or more personalized rewards based upon the accumulated reward points. The one or more personalized rewards may include one or more indications of money, a personalized product, a personalized service, a personalized insurance adjustment, a personalized discount on goods and services, and a personalized recommendation of goods and services.

In yet another aspect, the method may include, via one or more remote or local processors, servers, sensors, and/or transceivers, establishing and transmitting a plurality of intermediate goals for each of the target health goal, target community goal and target financial goal to the plurality of devices associate with the user. In this manner, the current and continued personal health levels are determined based upon a completion status of each of the plurality of intermediate goals established for the target health goal, the current and continued community activity levels are determined based upon a completion status of each of the plurality of intermediate goals established for the target community goal, and the current and continued financial independence levels are determined based upon a completion status of each of the plurality of intermediate goals established for the target financial goal.

According to another embodiment, the present disclosure provides a computer system for providing personalized rewards for lifestyle management based upon the well-being of a user. The computer system includes a plurality of devices associated with the user and a server communicatively connected to the plurality of devices. The server may be configured to receive, a target health goal, a target community goal, and a target financial goal from the plurality of devices. The server may also be configured to receive a first set of data during a first period of time from the plurality of devices. The first set of data may include a first health data set indicating a current personal health level for the user, a first community data set indicating a current community activity level for the user, and a first financial data set indicating a current financial independence level for the user. The server may be configured to analyze the first set of data to determine whether: (i) the target health goal has been met during the first period of time based upon the first health data set, (ii) whether the target community goal has been met during the first period of time based upon the first community data set, and/or (iii) whether the target financial goal has been met during the first period of time based upon the first financial data set.

In response to determining that the target health goal, the target community goal and the target financial goal have been met during the first period of time, the server may be configured to receive a second set of data during a second period of time from the plurality of devices. The second set of data may include a second health data set indicating a continued personal health level for the user, a second community data set indicating a continued community activity level for the user, and/or a second financial data set indicating a continued financial independence level for the user. The server may be further configured to analyze the second set of data to determine whether: (a) the target health goal has been maintained during the second period of time based upon the second health data set, (b) whether the target community goal has been maintained during the second period of time based upon the second community data set, and (c) whether the target financial goal has been maintained during the second period of time based upon the second financial data set. In response to determining that the target health goal, the target community goal and the target financial goal have been maintained during the second period of time, the server may be configured to determine one or more personalized rewards for the user and transmit information indicating the one or more personalized rewards to the plurality of devices.

In a further aspect, the server may be configured to determine whether the target health goal has been met by determining whether the current personal health level is equal to or greater than a desired personal health level during the first period of time. The server may also be configured to determine whether the target health goal has been maintained by determining whether the continued personal health level is equal to or greater than the current personal health level during the second period of time.

Similarly, the server may be configured to determine whether the target community goal has been met by determining whether the current community activity level is equal to or greater than a desired community activity level during the first period of time. The server may also be configured to determine whether the target community goal has been maintained by determining whether the continued community activity level is equal to or greater than the current community activity level during the second period of time.

Likewise, the server may be configured to determine whether the target financial goal has been met by determining whether the current financial independence level is equal to or greater than a desired financial independence level during the first period of time. The server may also be configured to determine whether the target financial goal has been maintained by determining whether the continued financial independence level is equal to or greater than the current financial independence level during the second period of time.

In another aspect, the server may be configured to determine the one or more personalized rewards by accumulating reward points when the target health goal, the target community goal and the target financial goal have been met during the first period of time. Additional reward points may be accumulated when the target health goal, the target community goal and the target financial goal have been maintained during the second period of time. The server may be then configured to determine the one or more personalized rewards based upon the accumulated reward points. The one or more personalized rewards may include one or more indications of money, a personalized product, a personalized service, a personalized insurance adjustment, a personalized discount on goods and services, and a personalized recommendation of goods and services.

In yet another aspect, the server may be further configured to establish and transmit a plurality of intermediate goals for each of the target health goal, target community goal and target financial goal. In this manner, the current and continued personal health levels may be determined based upon a completion status of each of the plurality of intermediate goals established for the target health goal, the current and continued community activity levels may be determined based upon a completion status of each of the plurality of intermediate goals established for the target community goal, and the current and continued financial independence levels may be determined based upon a completion status of each of the plurality of intermediate goals established for the target financial goal.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 2 is a flow chart illustrating an exemplary computer-implemented method for providing personalized rewards for lifestyle management based upon the well-being of the user;

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
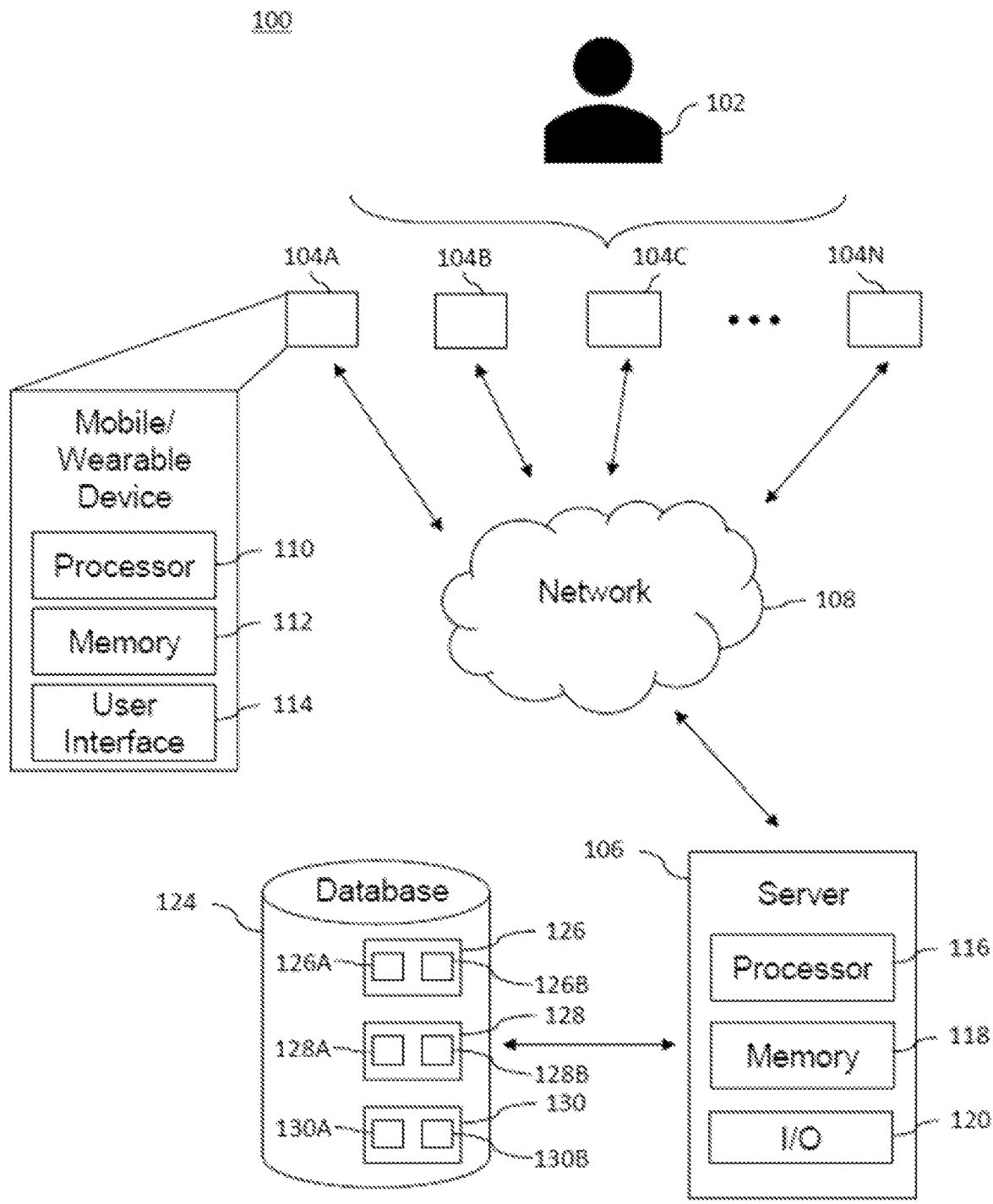
FIG. 1 is a block diagram illustrating an exemplary system for providing personalized rewards for lifestyle management based upon the well-being of a user.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings. One of ordinary skill in the art will realize that the embodiments provided can be implemented in hardware, software, firmware, and/or a combination thereof. Programming code according to the embodiments can be implemented in any viable programming language or a combination of a high-level programming language and a lower level programming language.

As disclosed herein, an individual or user is rewarded based upon positive trends in the user's well-being. This well-being is derived from at least three categories of information including the user's personal health (e.g., physical and/or mental health), the user's community involvement (e.g., community activities), and the user's financial planning (e.g., savings, investments). The user may define target goals for each of the three categories and work toward achieving those goals. When the target goals have been achieved and maintained over a period of time, the user receives personalized rewards (e.g., personalized products or services) as a way to encourage the user to further improve and/or maintain his or her well-being.

Exemplary Computer System

FIG. 1 is a block diagram of a computer system 100 for providing personalized rewards for lifestyle management based upon the well-being of a user 102. A plurality of mobile and/or wearable devices 104A-104N may be associated with user 102. Each device 104A-104N is communicatively connected to a server 106 (e.g., an insurer's computer system) via a network 108 (e.g., a local area network (LAN), a wide area network (WAN), a personal area network (PAN), the Internet, etc.). While only four devices are shown in FIG. 1, any number of devices may be contemplated in other embodiments.

Each device 104A-104N includes a processor 110 (e.g., a central processing unit (CPU), a graphics processing unit (GPU)), a memory 112 (e.g., random-access memory (RAM), read-only memory (ROM), flash memory) and a user interface 114 (e.g., a display screen, a touchscreen, a keyboard). In general, devices 104A-104N may include any existing or future devices capable of detecting, collecting, storing, transmitting, and/or displaying data associated with user 102, and may, for example, be wearable, implantable, ingestible, hand-held, or placed off the body.

As an example, device 104A may be a mobile device such as a smartphone, a tablet, a laptop, or any other suitable computing device. Device 104B may be a wearable device (e.g., a smart watch or fitness bracelet, or smart glasses) configured to measure fitness activities such as walking, running, biking, weight training, etc. Device 104C may be a wearable device configured to measure biometric markers such as blood glucose levels, cholesterol levels, vitamin levels, etc. Device 104N may be an ingestible device (e.g., smart pills) that measures medication usage such as the correct intake of medicine. Other examples of devices 104A-104N may include temperature sensors, motion sensors, heart rate monitors, pulse oximeters, sleep pattern monitors, smart scales, smart utensils, and the like.

In some embodiments, devices 104A-104N may be in the form of smart home sensors and/or smart vehicle sensors. Smart home sensors may be located at a residence of user 102. For example, smart home sensors may include utility meter sensors that generate data associated with energy usage at the residence (e.g., water sensors, gas sensors, electricity sensors, etc.), smart appliance sensors that generate data associated with the operation of various appliances at the residence (e.g., sensors in a smart refrigerator that indicate temperature settings), and/or home automation sensors that generate data associated with the control and/or automation of the residence (e.g., light level settings, home alarm settings, thermostat settings, etc.). Smart vehicle sensors may be located in a vehicle associated with user 102. For example, smart vehicle sensors may include sensors that generate data associated with the physical and/or mental conditions of user 102 while driving the vehicle (e.g., sensors that measure eye movement, reaction time, etc.), and/or interactions that user 102 have with the vehicle (e.g., sensors that measure vehicle following distance, response to safety warning systems, etc.). In any event, these and other sensors may provide additional sources of data (including image and audio data) associated with user 102.

Data collected by each device 104A-104N may be stored in its respective memory 112 before being transmitted to server 106 via network 108. In some embodiments, data collected by devices 104A-104N may be transmitted directly to server 106 via network 108. In other embodiments, some devices (e.g., wearable device 104B) may transmit collected data to an intermediate device (e.g., mobile device 104A) for storage before the intermediate device transmits the data over to server 106. In still other embodiments, data collected by devices 104A-104N may be transmitted to server 106 via a third party. For example, a data monitoring system (not shown in FIG. 1) may store any and all data collected by devices 104A-104N and transmit that data to server 106 via network 108 or a different network.

Server 106 includes a processor 116 (e.g., a microprocessor, a microcontroller), a memory 118, and an input/output (I/O) controller 120 (e.g., a network transceiver). Server 106 may be a single server or a plurality of servers with distributed processing. A database 124, which may be a single database or a collection of two or more databases, is coupled to server 106. In one example, database 124 is part of server 106. In another example, server 106 accesses database 124 via a network such as network 108. Server 106 may also include various software applications stored in memory 118 and executable by processor 116. These software applications may include specific programs, routines, or scripts for performing functions associated with the methods described herein. Additionally, the software applications may include general-purpose software applications for data processing, database management, data analysis, network communication, web server operation, or other functions described herein or typically performed by a server.

In operation, server 106 receives data associated with user 102 from devices 104A-104D and stores the data in database 124. Server 106 then analyzes the data to determine the well-being of user 102 and provide user 102 with personalized rewards. The well-being of user 102 is derived from at least three categories of information including personal health, community involvement, and financial planning. Other suitable information categories may be contemplated in other embodiments.

Personal health relates to the physical and/or mental health of user 102. Physical health may be based upon various physical activities performed by user 102 such as the number of steps walked, number of stairs climbed, number of miles cycled, etc. Physical health may also be based upon various physiological parameters of user 102 such as blood pressure, heart rate, body mass index (BMI), etc. Further, physical health can be based upon the nutritional intakes of user 102 (e.g., vitamin intake). Still further, physical health can be based upon various biometric markers associated with user 102 such as blood glucose level or cholesterol level.

Mental health can be based in part on the behaviors of user 102 such as how much time user 102 spends practicing meditation or other relaxation techniques, how much sleep user 102 gets per night, how often user 102 works overtime, and the like. Other factors that contribute to physical and/or mental health may include adherence to a prescription drug regimen and environmental conditions (e.g., living in a cold house can increase the risk of respiratory illness due to increased dampness). Data associated with the physical and/or mental health of user 102 may be self-reported or collected by a mobile and/or wearable device (e.g., any of devices 104A-104N). This data may be stored as health data 126 in database 124.

Community involvement relates to any number of civic and/or community activities that user 102 partakes in. For example, civic and/or community activities may include volunteering, voting, interacting with neighbors, participating in community or charitable events, accessing social media to discuss current events, and the like. Data associated with the civic and/or community activities of user 102 may be self-reported or collected through a mobile device (e.g., by retrieving calendar events stored in mobile device 104A). This data may be stored as community data 128 in database 124.

Financial planning relates to the level of financial independence achieved by user 102. This may include the amount of savings, retirement funds, life insurance policies, and/or other suitable investments made by user 102 for retirement or general life planning purposes. Data associated with the financial planning of user 102 may be self-reported or collected through a mobile device (e.g., by retrieving savings account information stored in mobile device 104A). This data may be stored as financial data 130 in database 124.

Health data 126, community data 128, financial data 130, and/or other types of data associated with user 102 may only be gathered and stored in database 124 with the full understanding and permission of user 102. That is, before devices 104A-104N can collect data, a visual or other prompt may alert user 102 to such action. For example, a prompt may be generated on mobile device 104A to allow user 102 to "opt out" of some or all collection of health data 126, community data 128, financial data 130, and/or any other types of data as described herein.

For better lifestyle management, user 102 first defines a set of target goals for each of the three categories of information that characterize the well-being of user 102. This may entail defining a target health goal that outlines a desired personal health level, a target community goal that outlines a desired community activity level, and a target financial goal that outlines a desired financial independence level. The target goals may be defined for a period of time (e.g., a week, a month, a year, etc.). As an example, the target health goal may involve user 102 achieving a certain BMI during a 6-month period. The target community goal may involve user 102 attending a certain number of charitable events during the same 6-month period. The target financial goal may involve user 102 saving a certain amount of retirement funds during the same 6-month period. User 102 may define these target goals using a mobile device (e.g., device 104A) and send the defined target goals to server 106 to be stored in database 124.

Once defined, user 102 can perform activities necessary to achieve the target goals (e.g., exercising, dieting, going to charitable events, contributing to a 401(k) plan, etc.). Devices 104A-104N then collect the data associated with user 102 performing those activities and send the data to server 106 for storage and processing. Accordingly, server 106 receives a first set of data during a first period of time (e.g., initial 6 months), which includes a first health data set 126A indicating a current personal health level for user 102, a first community data set 128A indicating a current community activity level for user 102, and a first financial data set 130A indicating a current financial independence level for user 102.

Server 106 analyzes the first set of data to determine whether the target goals have been met. In particular, server 106 analyzes first health data set 126A to determine whether the target health goal has been met. That is, whether the current personal health level is equal to or greater than the desired personal health level during the first period of time (e.g., whether user 102 achieved the certain BMI during the 6-month period). Similarly, server 106 analyzes first community data set 128A to determine whether the target community goal has been met. That is, whether the current community activity level is equal to or greater than the desired community activity level during the first period of time (e.g., whether user 102 attended the certain number of charitable events during the 6-month period). Likewise, server 106 analyzes first financial data set 130A to determine whether the target financial goal has been met. That is, whether the current financial independence level is equal to or greater than the desired financial independence level during the first period of time (e.g., whether user 102 saved the certain amount of retirement funds during the 6-month period).

If the target goals have been met during the first period of time, server 106 continues to receive a second set of data during a second period of time (e.g., subsequent 6 months). The second set of data includes a second health data set 126B indicating a continued personal health level for user 102, a second community data set 128B indicating a continued community activity level for user 102, and a second financial data set 130B indicating a continued financial independence level for user 102.

Server 106 analyzes the second set of data to determine whether the target goals have been maintained. In particular, server 106 analyzes second health data set 126B to determine whether the target health goal has been maintained. That is, whether the continued personal health level is equal to or greater than the current personal health level during the second period of time (e.g., whether user 102 continued to achieve the same BMI during the subsequent 6-month period).

Similarly, server 106 analyzes second community data set 128B to determine whether the target community goal has been maintained. That is, whether the continued community activity level is equal to or greater than the current community activity level during the second period of time (e.g., whether user 102 continued to attend the same number of charitable events during the subsequent 6-month period).

Likewise, server 106 analyzes second financial data set 130B to determine whether the target financial goal has been maintained. That is, whether the continued financial independence level is equal to or greater than the current financial independence level during the second period of time (e.g., whether user 102 continued to save the same amount of retirement funds during the subsequent 6-month period).

If the target goals have been maintained during the second period of time, server 106 determines one or more personalized rewards as a way to encourage user 102 to further improve and/or maintain his or her well-being. The personalized rewards may include various incentives for user 102 such as indications of money, personalized products or services (e.g., customized retirement portfolios, customized vitamin intakes, customized recipes, customized exercise regimes, customized estate planning, etc.), personalized insurance adjustments (e.g., customized changes in insurance policy coverage, customized reduction in premiums, etc.), personalized discounts on goods and services (e.g., customized coupons or gift cards), personalized recommendations of goods and services (e.g., recommendation to increase retirement contributions, recommendation to shop for certain nutritional products, etc.). Server 106 may transmit information indicating these personalized rewards to user 102 (e.g., to device 104A via network 108).

In some embodiments, server 106 determines the personalized rewards based upon points accumulated by user 102. For example, when user 102 meets the target goals during the first period of time, server 106 provides reward points to user 102. Additional reward points can be earned when user 102 maintains the target goals during the second period of time.

In some embodiments, server 106 creates a game for user 102 to play so that user 102 can achieve and maintain the target goals. For example, upon receiving the target goals, server 106 may establish a plurality of intermediate goals for user 102 to accomplish. These intermediate goals may be transmitted to user 102 (e.g., to be displayed on device 104A) and may involve daily tasks that user 102 needs to complete in order to reach the final target goal (e.g., daily exercise or dietary package that would allow user 102 to achieve the desired BMI).

In this manner, the current and continued personal health levels may be determined based upon a completion status of each of a plurality of intermediate goals established for the target health goal. Similarly, the current and continued community activity levels may be determined based upon a completion status of each of a plurality of intermediate goals established for the target community goal. Likewise, the current and continued financial independence levels may be determined based upon a completion status of each of a plurality of intermediate goals established for the target financial goal.

As user 102 completes each intermediate goal, points may be earned. In one embodiment, server 106 may allow user 102 to create an avatar that represents user 102 in the game. The avatar may change attributes as each intermediate goal is accomplished, as such the avatar may be a dynamic avatar. For example, the avatar may change its appearance as the game progresses (e.g., avatar gets more muscular as user 102 completes more exercises). Other aspects of the game may include allowing user 102 to join a community of users working to achieve a set of common target goals or allowing user 102 to monitor the progress of other users in the game as a means to provide motivation. In some embodiments, intermediate goals of varying intensity, complexity and/or duration may be designed for different niche segments of users such as seniors, active athletes, individuals undergoing physical therapy, etc.

Exemplary Computer-Implemented Method

Referring next to FIG. 2, a computer-implemented method 200 for providing personalized rewards for lifestyle management based upon the well-being of a user is shown. Method 200 can be performed by a server (e.g., 106). At block 202, method 200 receives a target health goal, a target community goal, and a target financial goal from the user. The target goals may be received from a plurality of devices (e.g., 104A-104N) associated with the user.

At block 204, method 200 may receive a first set of data during a first period of time. The first set of data includes a first health data set indicating a current personal health level for the user, a first community data set indicating a current community activity level for the user, and a first financial data set indicating a current financial independence level for the user.

At block 206, method 200 may analyze the first set of data to determine whether the target goals have been met. In particular, method 200 may determine whether the target health goal has been met during the first period of time based upon the first health data set. Method 200 may also determine whether the target community goal has been met during the first period of time based upon the first community data set. Method 200 may further determine whether the target financial goal has been met during the first period of time based upon the first financial data set.

In various embodiments, method 200 may determine whether the target health goal has been met by determining whether the current personal health level is equal to or greater than a desired personal health level during the first period of time. The desired personal health level may be defined by the user in the target health goal. Similarly, method 200 may determine whether the target community goal has been met by determining whether the current community activity level is equal to or greater than a desired community activity level during the first period of time. The desired community activity level may be defined by the user in the target community goal. Likewise, method 200 may determine whether the target financial goal has been met by determining whether the current financial independence level is equal to or greater than a desired financial independence level during the first period of time. The desired financial independence level may be defined by the user in the target financial goal.

At block 208, in response to determining that the target goals have been met during the first period of time, method 200 may receive a second set of data during a second period of time. The second set of data includes a second health data set indicating a continued personal health level for the user, a second community data set indicating a continued community activity level for the user, and a second financial data set indicating a continued financial independence level for the user. The first and second periods of time may be equal in duration or may have different durations.

At block 210, method 200 may analyze the second set of data to determine whether the target goals have been maintained. In particular, method 200 may determine whether the target health goal has been maintained during the second period of time based upon the second health data set. Method 200 may also determine whether the target community goal has been maintained during the second period of time based upon the second community data set. Method 200 may further determine whether the target financial goal has been maintained during the second period of time based upon the second financial data set.

In various embodiments, method 200 may determine whether the target health goal has been maintained by determining whether the continued personal health level is equal to or greater than the current personal health level during the second period of time. Similarly, method 200 may determine whether the target community goal has been maintained by determining whether the continued community activity level is equal to or greater than the current community activity level during the second period of time. Likewise, method 200 may determine whether the target financial goal has been maintained by determining whether the continued financial independence level is equal to or greater than the current financial independence level during the second period of time.

At block 212, in response to determining that the target goals have been maintained during the second period of time, method 200 may determine one or more personalized rewards for the user. The personalized rewards may include one or more indications of money, a personalized product, a personalized service, a personalized insurance adjustment, a personalized discount on goods and services, and a personalized recommendation of goods and services.

At block 214, method 200 may transmit information indicating the one or more personalized rewards to the user, such as to a user mobile device via wireless communication or data transmission over one or more radio frequency links.

In some embodiments, reward points may be accumulated when the target health goal, the target community goal and the target financial goal have been met during the first period of time. Additional reward points may be accumulated when the target health goal, the target community goal and the target financial goal have been maintained during the second period of time. Method 200 may then determine the one or more personalized rewards based upon the accumulated reward points.

In some embodiments, method 200 may establish a plurality of intermediate goals for each of the target health goal, target community goal and target financial goal. Method 200 may then transmit the plurality of intermediate goals for each of the target health goal, target community goal and target financial goal to the user or the user's mobile device, such as via wireless communication or data transmission over one or more radio frequency links. In this manner, the current and continued personal health levels may be determined based upon a completion status of each of the plurality of intermediate goals established for the target health goal, the current and continued community activity levels may be determined based upon a completion status of each of the plurality of intermediate goals established for the target community goal, and the current and continued financial independence levels may be determined based upon a completion status of each of the plurality of intermediate goals established for the target financial goal.

It should be understood that although method 200 in FIG. 2 is described as being performed by server 106, in some examples, such method may be performed by a mobile device (e.g., 104A). Further, in some examples, server 106 may have artificial intelligence capabilities that perform machine learning based upon historical data obtained by collecting and analyzing past system performances. The systems and methods described herein operate to provide better lifestyle management for individuals by helping them to prepare for the unexpected, to preserve their health and wealth, and to protect various aspects of their lives.

Exemplary Process

Figure 3:
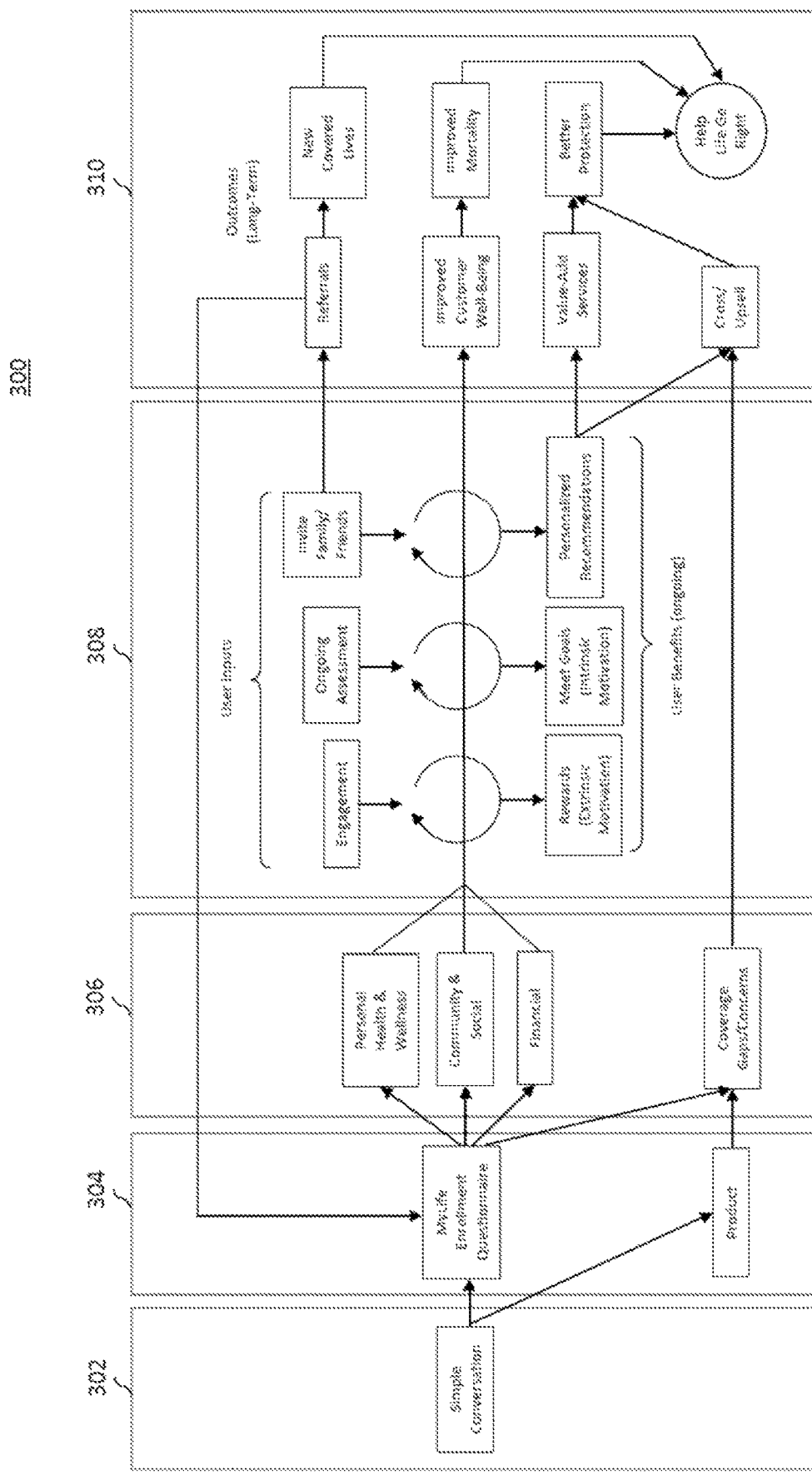
FIG. 3 is a block diagram illustrating an exemplary process for the user to undertake in order to receive personalized rewards for lifestyle management based upon the well-being of the user.

Referring now to FIG. 3, a process 300 for a user (e.g., 102) to undertake in order to receive personalized rewards for lifestyle management based upon the well-being of the user is shown. Process 300 includes a plurality of stages 302-310. At stage 302, the user begins a conversation with an insurance provider to discuss about the user's lifestyle goals and/or needs (e.g., financial needs, insurance needs, etc.). The conversation may be conducted over the phone, via a mobile device (e.g., 104A), and/or in person.

At stage 304, the user enrolls in a rewards program for attaining personal well-being by completing a set of initial questionnaires and defining a set of target goals (e.g., target health goal, target community goal, target financial goal). The questionnaires may be provided by the insurance provider. The purpose of the questionnaires is to determine what motivates the user to strive for those target goals and how the user will hold himself/herself accountable to meet those goals. At stage 304, various products (e.g., insurance products) may also be identified for the user based upon the user's answers to the questionnaires.

At stage 306, the user will begin working toward the target goals. The targeted goals may include personal health and wellness, community and social, and financial. For example, this may involve the user performing various activities necessary to achieve the goals (e.g., exercising, dieting, going to charitable events, contributing to a 401(k) plan, etc.). Any concerns about the various products identified in stage 304 can also be addressed at this stage.

At stage 308, the user provides inputs to indicate his/her progress. For example, various data associated with the user (e.g., 126, 128, 130) may be gathered and analyzed to determine if the user has met and/or maintained the target goals. These inputs provide an ongoing assessment of the user, which in turn create a form of intrinsic motivation or satisfaction for the user when the user meets his/her defined target goals. As the target goals are achieved and maintained, the user will receive rewards and/or personalized recommendations, which provide a form of extrinsic motivation for the user to further improve and/or maintain the user's well-being. Additionally, the user can invite family and/or friends to join the rewards program. In this case, each invitee may enroll in his/her own rewards program by first completing the set of initial questionnaires.

At stage 310, the long-term benefits or outcomes of the rewards program can be realized. For example, by improving his/her personal well-being, the user can achieve a more enjoyable lifestyle as well as improved mortality. Further, the personalized recommendations provided to the user will enable the user to better customize his/her lifestyle needs (e.g., insurance needs). This in turn will offer better life protection for the user and the user's family. For the insurance provider, referrals by the user to join the rewards program will generate additional business and allow the insurance provider to serve increasing segments of the population.

In the illustrative embodiment, the process 300 may be performed by an application running on a mobile device (or other computing device, such as smart glasses or a wearable device) of a user. As discussed above, the application may be used to monitor and promote personal well-being related to health and wellness, community and social connection, and financial status of the user. The user may use the application to update the user's personal information. It should be appreciated that the functionality of the application may be configured based upon a role of the user (e.g., insured, beneficiaries, trustees, family members of an insured) to provide services that are relevant to the role of the user. Moreover, the application may further be used to upload and store documents that are important or may become relevant in the future.

For example, the application may provide beneficiary services for beneficiaries of a life policy. It may help them to guide them through one or more services or products when the life policy is due, such as claim management, estate planning, estate settlement, and online document storage to store any legal or estate documents.

In some embodiments, the application may provide services to people with chronic diseases to keep track of their conditions (e.g., for people with diabetes, the application may remind the user to sync data using a glucometer to monitor a glucose level), to provide them with health trends to manage their conditions, and/or provide prescription discounts if they are picking up medications regularly.

Exemplary Process

Figure 4:
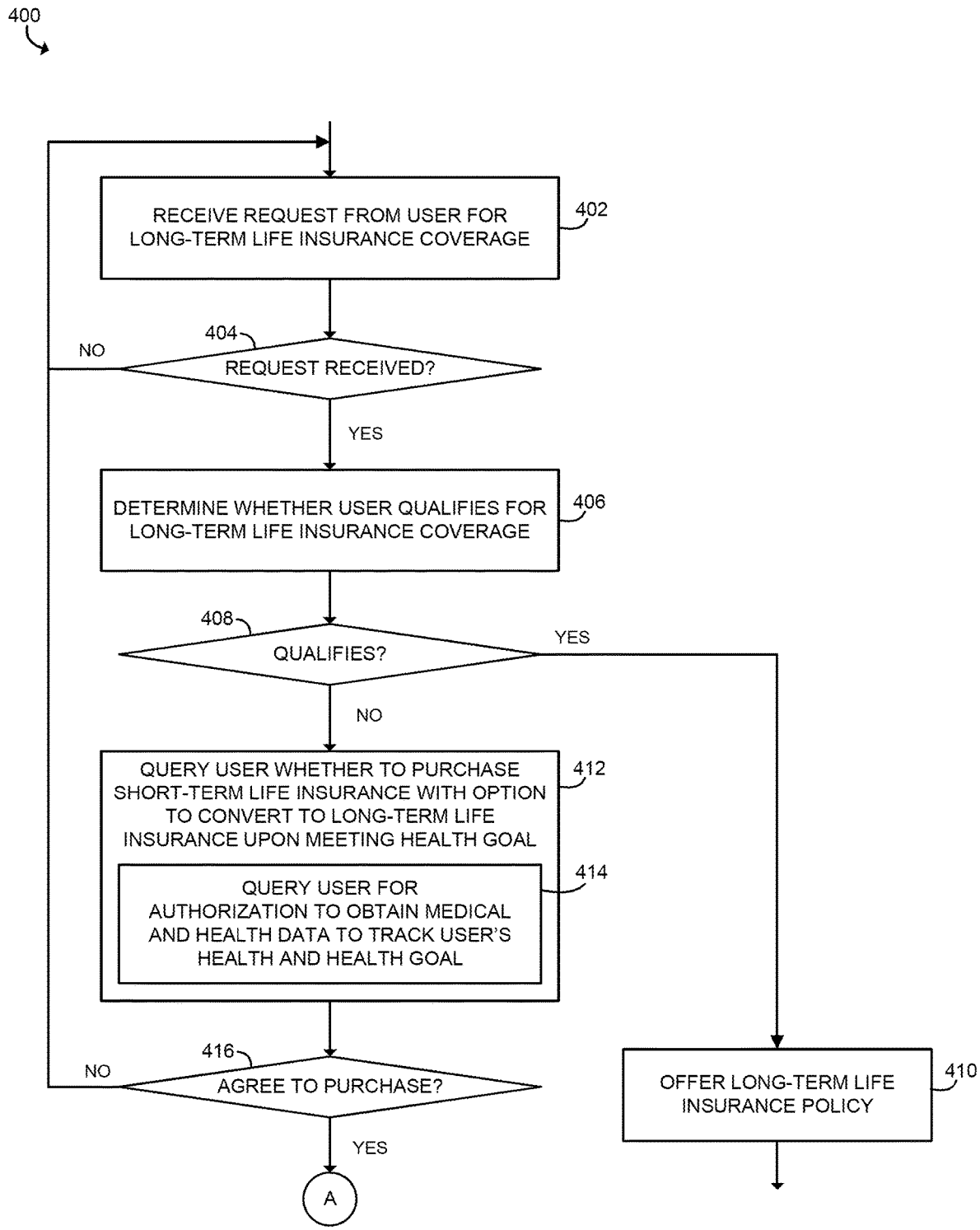
FIGS. 4 and 5 are a flow chart illustrating an exemplary computer-implemented method for facilitating a user who is under-qualified for a long-term life insurance policy to become quailed for a long-term life insurance coverage.
Figure 5:
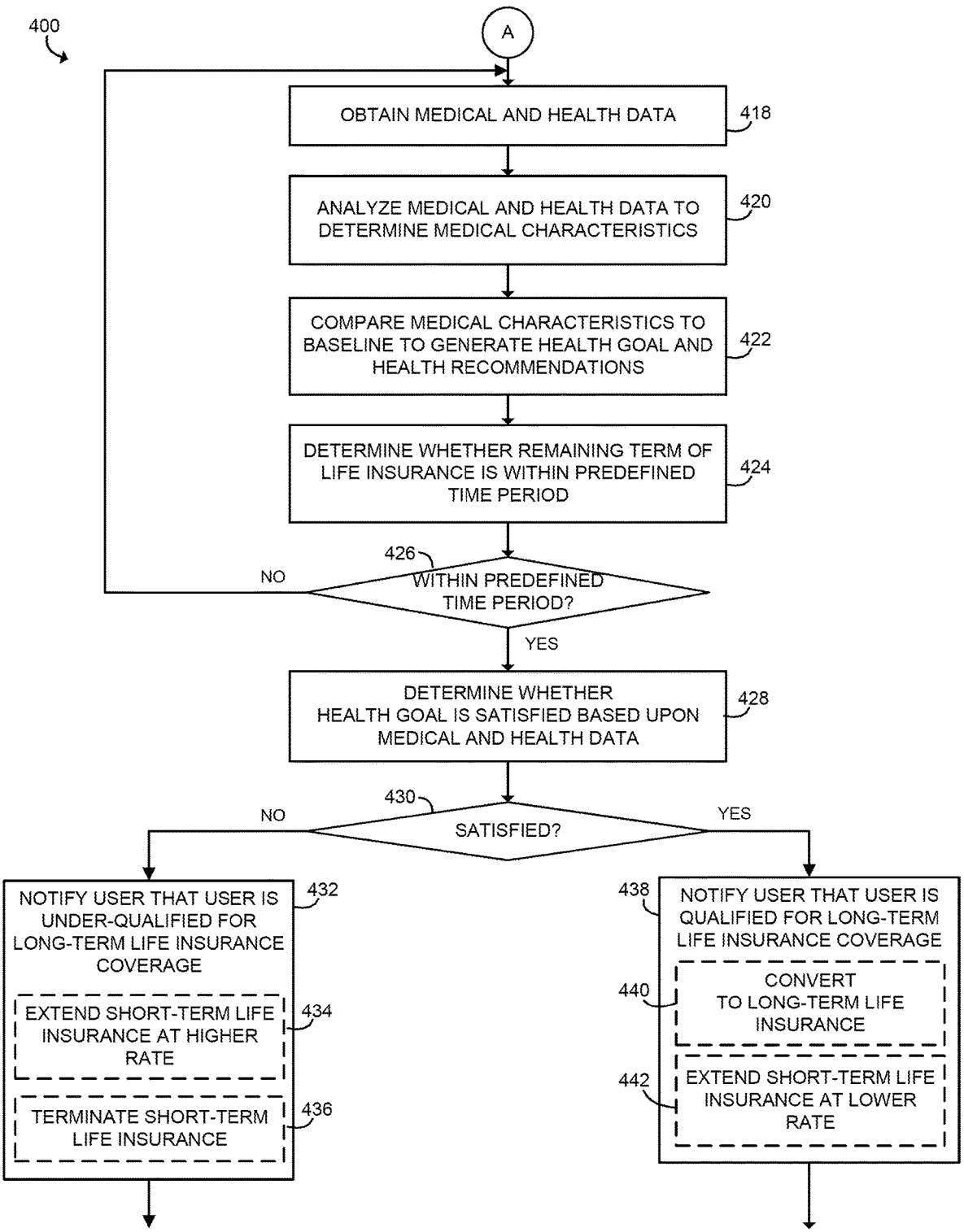

Referring now to FIGS. 4 and 5, a method 400 for facilitating a user (e.g., 102) who is under-qualified for a long-term life insurance policy to become qualified for a long-term life insurance coverage is shown. In the illustrative embodiment, the method 400 is performed by a server (e.g., 106) that is associated with an insurer providing life insurance policies. In block 402, the server 106 receives a request from a user for a long-term life insurance coverage. If the server 106 determines that the request has not been received in block 404, the method 400 loops back to 402 to continue waiting for a request. If, however, the server 106 determines that the request has been received from a user, the method 400 advances to block 406.

In block 406, the server 106 determines whether a user qualifies for a long-term life insurance coverage. To do so, the server 106 may obtain or receive medical and health information from the user during the application process to determine whether the user is qualified for a long-term life insurance policy. For example, the user may complete a set of initial questionnaires to apply for a long-term life insurance policy, during which the user may provide medical and health information or authorize the server 106 to obtain the medical and health information of the user. It should be appreciated that the user may fill out the questionnaires via an application running on a computing device (e.g., a user's mobile device) or a website.

If the server 106 determines that the user qualifies for a long-term life insurance coverage in block 408, the method 400 advances to block 410 to notify the user that the user is qualified for a long-term life insurance coverage and provide more details. If, however, the server 106 determines that the user does not qualify for a long-term life insurance coverage, the method 400 advances to 412.

In block 412, the server 106 queries the user whether to purchase a short-term life insurance instead with an option to convert to a long-term life insurance upon meeting a health goal provided by the insurer. To do so, the server 106 further queries the user for an authorization to obtain medical and health data to track the user's health and health goal, as indicated in block 414. For example, the medical data may include the user's medical information and records, prescription records and history, past medical claims, and/or family medical history. Such medical data may be provided by the user or obtained from a third party (e.g., a medical provider, a pharmacy, and/or one or more insurers). The health data may include any information that may be related to or indicate user's health, such as exercise habits, eating habits, nutrition, and biometrics. The health data may be obtained from one or more applications on the user's mobile device.

If the user does not wish to purchase a short-term life insurance coverage in block 416, the method 400 loops back to block 402 to continue waiting a new request for a long-term life insurance. If, however, the user accepts the terms and agrees to purchase a short-term life insurance coverage in block 416, the method 400 advances to block 418 in FIG. 5.

In block 418, the server 160 obtains or receives the medical and health data of the user. As described above, the medical data may include the user's medical information and records, prescription records and history, past medical claims, and/or family medical history. Such medical data may be provided by the user or obtained from a third party (e.g., a medical provider, a pharmacy, and/or one or more insurers). The health data may include any information that may be related to or indicate user's health, such as exercise habits, eating habits, nutrition, and biometrics. The health data may be obtained from one or more applications on the user's mobile device, wearable devices, or other computing devices.

Subsequently, in block 420, the server 160 analyzes the medical and health data to determine medical characteristics. The server 160 compares the medical characteristics of the user to a baseline to generate a health goal for the user and health recommendations to reach that health goal, as indicated in block 422. The baseline may represent a minimum health condition set by the insurer that a user need to meet in order to be qualified for a long-term life insurance coverage. In some embodiments, the baseline may depend on the medical characteristics of the user. For example, a person with complicated medical and health conditions may have a different baseline compared to a healthy person. However, it should be appreciated that terms of a long-term life insurance coverage may also be different depending on the person's medical characteristics.

In block 424, the server 160 determines whether the remaining term of the short-term life insurance is within a predefined time period (e.g., a month from the expiry date). If the server 160 determines that the remaining term is not within the predefined time period in block 426, the method 400 loops back to block 418 to continue obtaining and receiving updated medical and health data of the user to continue analyze and update the medical characteristics of the user. The server 160 may also update the recommendations to reach the health goal based upon the updated medical and health data.

If, however, the server 160 determines that the remaining term is within the predefined time period in block 426, the method 400 advances to block 428 to determine whether the health goal is satisfied based upon the medical and health data of the user.

If the server 160 determines that the health goal has not been satisfied in block 430, the method 400 advances to block 432 to notify the user that the user is under-qualified for a long-term life insurance coverage. In some embodiments, the server 160 may extend the current short-term life insurance coverage at the same rate or a different rate to reflect actual risk based upon the current medical characteristics of the user, or if the user prefers, terminate the short-term life insurance, as indicated in blocks 434 and 436.

Referring back to block 430, if the server 160 determines that the health goal has been satisfied, the method 400 skips ahead to block 438 to notify the user that the user is now qualified for a long-term life insurance coverage and provide more details. In some embodiments, the server 160 may provide an option to convert the short-term life insurance to a long-term life insurance if the user so desires, as indicated in block 440. Alternatively, the server 160 may provide an option to extend the current short-term life insurance at a lower rate based upon the current medical characteristics of the user, as indicated in block 442. In some embodiments, the server 160 may provide an optimal life insurance plan for the user based upon the current and previous medical characteristics.

Exemplary Process

Figure 6:
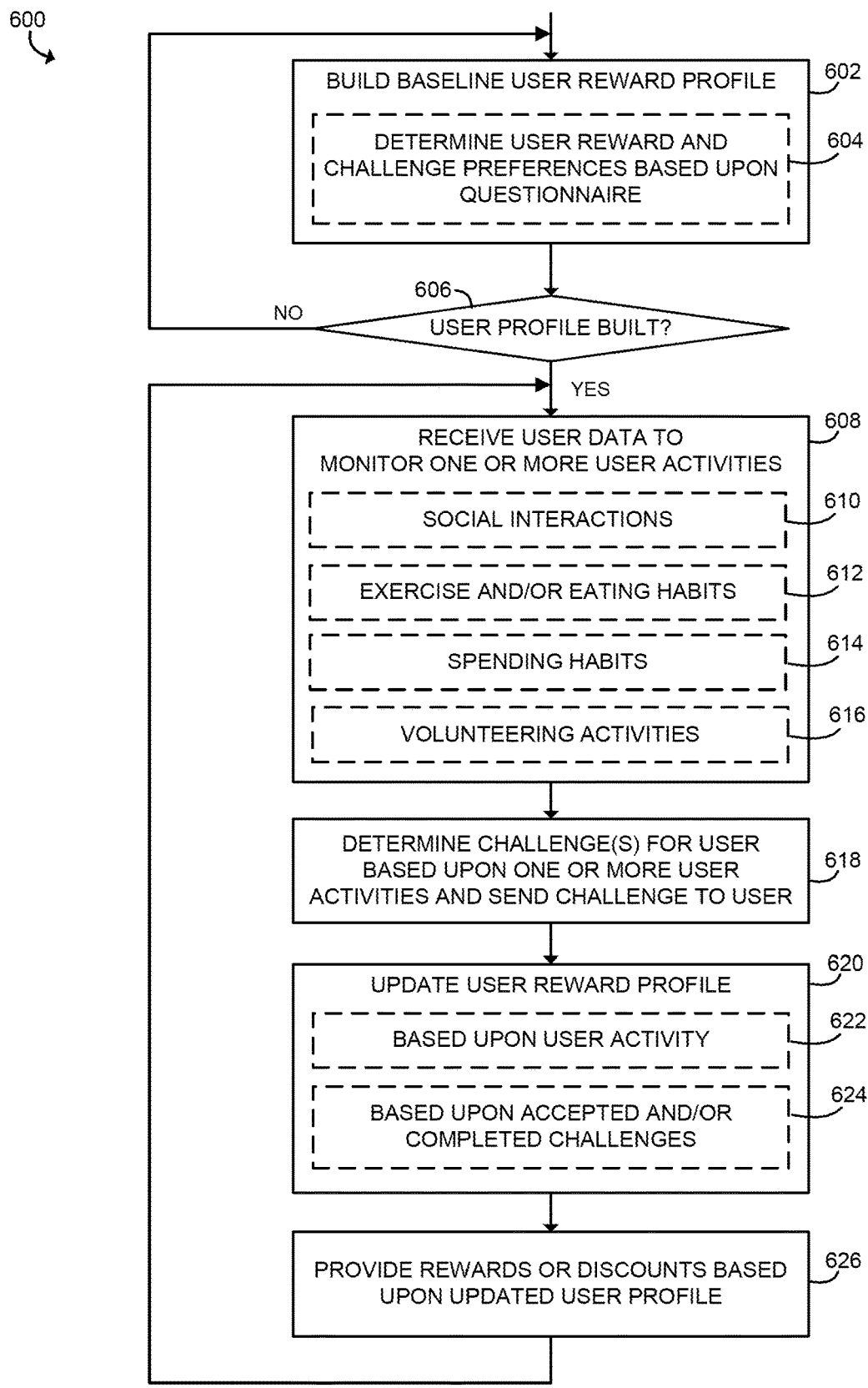
FIG. 6 is a flow chart illustrating an exemplary computer-implemented method for providing a personalized reward and/or challenge program to a user to promote health and wealth of the user.

Referring now to FIG. 6, a method 600 for providing a personalized reward and/or challenge program to a user (e.g., 102) to promote health and wealth of the user is shown. In the illustrative embodiment, the method 400 is performed by a server (e.g., 106) that is associated with an insurer.

In block 602, the server 106 builds an initial or baseline user reward profile. To do so, the server 160 may determine user reward and challenge preferences based upon a set of questionnaires that may be presented to the user. The questionnaires may be provided by the insurance provider. Based upon the questionnaires, the server 106 may determine which reward method motivates the user to strive for goals. For example, the user reward preference may include a preferred reward method (e.g., incentive vs. loss aversions). Some users may be more motivated to complete a challenge by earning points (e.g., the incentive method), whereas other users may be more motivated to complete a challenge by retaining points (e.g., the loss aversions method).

With the rewards method, for example, a user may be rewarded as the user completes each workout. With the loss aversions method, for example, a user may focus on a total number of workouts that the user is committed to complete, tick down for any missed workouts, and be rewarded based upon a percentage of goal achieved. The user challenge preference may include a type of challenge (e.g., physical wellness, nutrition, prescription adherence, financial, and estate planning) and a duration of challenge.

If the server 106 determines that the user profile has not been created, the method 600 loops back to block 602 to complete the user profile. If, however, the server 160 determines that the user profile has been created, the method 600 advances to block 608.

In block 608, the server 106 receives user data to monitor one or more user activities. For example, the user activities may include social interactions, exercise habits, eating habits, spending habits, and volunteering activities, as indicated in blocks 610-616. By monitoring the user activities, the server 106 may monitor and keep track of physical health and wellness, nutrition, community and social connections, and financial status of the user.

In block 618, the server 106 determines one or more challenges for the user based upon one or more user activities and present those challenges to the user. To do so, the server 106 may generate one or more challenges or select one or more challenges from a list of predetermined challenges based upon the user data and/or the user reward preference. For example, the challenges that are presented to the user may include those activities that the user is actively engaged in and may further promote user's overall health and/or wealth. Alternatively or additionally, the challenges that are presented to the user may include those activities that are designed to engage the user to strengthen the user's weakness based upon the user data. In the illustrative embodiment, the server 106 monitors whether the user accepts or rejects those challenges presented to the user and keep track of the user's responses.

In block 620, the server 106 updates the user reward profile. For example, the server 106 may periodically or continually receive the user data related to one or more user activities and update the user reward profile based upon the updated user data. The updated user data may indicate the user's progress in response to accepting or rejecting certain challenges.

Additionally or alternatively, as indicated in block 624, the server 106 may update the user reward profile based upon the one or more challenges that have been accepted and/or completed by the user. The server 106 may further monitor and analyze those accepted challenges to update the user challenge preference.

In the illustrative embodiment, the server 106 determines a user's accepted challenge pattern to present more appealing challenges that are more applicable to the user to promote user's overall health and/or wealth. It should be appreciated that the server 106 may use machine learning algorithm to generate one or more challenges and update the initial user reward profile.

In block 626, the server 106 provides rewards or discounts based upon the updated user profile. The method 600 then loops back to block 608 to continue to receive the updated user data to monitor one or more user activities.

Additional Considerations

With the foregoing, an insurance customer (e.g., user 102) may opt-in to a rewards program, an insurance discount program, or other types of programs to better manage his/her lifestyle. After the insurance customer provides his/her permission or affirmative consent, a remote server associated with an insurance provider may collect the insurance customer's personal health data, community involvement data, financial planning data and/or other types of data to help the insurance customer to achieve enhanced well-being. For example, the insurance customer may define target goals for achieving better personal health, greater community involvement and/or more financial independence. When these target goals have been achieved and maintained over a period of time, insurance customer may receive various personalized rewards such as discounts on personalized products/services or insurance cost savings related to auto, home, life, and other types of insurance from the insurance provider as a way to reward and encourage the insurance customer to further improve and/or maintain his or her well-being.

In one aspect, health data, community data, financial data, and/or other data, including the types of data discussed elsewhere herein, may be collected or received by the insurance customer's mobile device, an application running thereon, and/or an insurance provider remote server, such as via direct or indirect wireless communication or data transmission from the application ("app") running on the insurance customer's mobile device, after the insurance customer affirmatively consents or otherwise opts-in to an insurance discount, reward, or other program. The insurance provider may then analyze the data received with the insurance customer's permission to provide benefits and/or rewards to the insurance customer.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method for providing rewards for lifestyle management of a user, comprising:
    receiving, by a server from devices associated with the user, a health goal, a community goal, and a financial goal;
    determining, by the server using a first data set received from the devices during a first time period, whether the health goal, the community goal, and the financial goal were met during the first time period, the first data set indicating a current health level, a current community activity level, and a current financial independence level of the user;
    responding to determining that the health goal, the community goal, and the financial goal were met by determining, by the server using a second data set received from the devices during a second time period, whether the health goal, the community goal, and the financial goal were maintained during the second time period, the second data set indicating a continued health level, a continued community activity level, and a continued financial independence level of the user; and
    responding to determining that the health goal, the community goal, and the financial goal were maintained by transmitting, from the server to the devices, information indicating at least one reward for the user.

2. The computer-implemented method of claim 1, wherein determining whether the health goal has been met includes determining whether the current health level is equal to or greater than a desired health level during the first time period.

3. The computer-implemented method of claim 1, wherein determining whether the health goal has been maintained includes determining whether the continued health level is equal to or greater than the current health level during the second time period.

4. The computer-implemented method of claim 1, wherein determining whether the community goal has been met includes determining whether the current community activity level is equal to or greater than a desired community activity level during the first time period.

5. The computer-implemented method of claim 1, wherein determining whether the community goal has been maintained includes determining whether the continued community activity level is equal to or greater than the current community activity level during the second time period.

6. The computer-implemented method of claim 1, wherein determining whether the financial goal has been met includes determining whether the current financial independence level is equal to or greater than a desired financial independence level during the first time period.

7. The computer-implemented method of claim 1, wherein determining whether the financial goal has been maintained includes determining whether the continued financial independence level is equal to or greater than the current financial independence level during the second time period.

8. The computer-implemented method of claim 1, further comprising:
    accumulating reward points when the health goal, the community goal and the financial goal were met during the first time period;
    accumulating additional reward points when the health goal, the community goal and the financial goal were maintained during the second time period; and
    determining the at least one reward based upon the accumulated reward points.

9. The computer-implemented method of claim 8, wherein the at least one reward includes one or more indications of money, a personalized product, a personalized service, a personalized insurance adjustment, a personalized discount on goods and services, and a personalized recommendation of goods and services.

10. The computer-implemented method of claim 1, further comprising:
    establishing, by the server, a plurality of intermediate goals for each of the health goal, the community goal, and the financial goal; and
    transmitting, by the server to the devices, the plurality of intermediate goals;
    wherein the current and continued health levels are determined based upon a completion status of each of the plurality of intermediate goals established for the health goal, the current and continued community activity levels are determined based upon a completion status of each of the plurality of intermediate goals established for the community goal, and the current and continued financial independence levels are determined based upon a completion status of each of the plurality of intermediate goals established for the financial goal.

11. A computer system for providing rewards for lifestyle management of a user, comprising:
    devices associated with the user; and
    a server communicatively connected to the devices, the server configured to:
        receive, from the devices, a health goal, a community goal, and a financial goal;
        determine, using a first data set received from the devices during a first time period, whether the health goal, the community goal, and the financial goal were met during the first time period, the first data set indicating a current health level, a current community activity level, and a current financial independence level of the user;

respond to determining that the health goal, the community goal, and the financial goal were met by determining, using a second data set received from the devices during a second time period, whether the health goal, the community goal, and the financial goal were maintained during the second time period, the second data set indicating a continued health level, a continued community activity level, and a continued financial independence level of the user; and respond to determining that the health goal, the community goal, and the financial goal were maintained by transmitting to the devices information indicating at least one reward for the user.

12. The computer system of claim 11, wherein the server is configured to determine whether the health goal has been met by determining whether the current health level is equal to or greater than a desired health level during the first time period.

13. The computer system of claim 11, wherein the server is configured to determine whether the health goal has been maintained by determining whether the continued health level is equal to or greater than the current health level during the second time period.

14. The computer system of claim 11, wherein the server is configured to determine whether the community goal has been met by determining whether the current community activity level is equal to or greater than a desired community activity level during the first time period.

15. The computer system of claim 11, wherein the server is configured to determine whether the community goal has been maintained by determining whether the continued community activity level is equal to or greater than the current community activity level during the second time period.

16. The computer system of claim 11, wherein the server is configured to determine whether the financial goal has been met by determining whether the current financial independence level is equal to or greater than a desired financial independence level during the first time period.

17. The computer system of claim 11, wherein the server is configured to determine whether the financial goal has been maintained by determining whether the continued financial independence level is equal to or greater than the current financial independence level during the second time period.

18. The computer system of claim 11, wherein the server is further configured to:
   accumulate reward points when the health goal, the community goal and the financial goal were met during the first time period;
   accumulate additional reward points when the health goal, the community goal and the financial goal were maintained during the second time period; and
   determining the at least one reward based upon the accumulated reward points.

19. The computer system of claim 18, wherein the at least one reward includes one or more indications of money, a personalized product, a personalized service, a personalized insurance adjustment, a personalized discount on goods and services, and a personalized recommendation of goods and services.

20. The computer system of claim 11, wherein the server is further configured to:
   establish a plurality of intermediate goals for each of the health goal, the community goal, and the financial goal; and
   transmit, to the devices, the plurality of intermediate goals;
   wherein the current and continued health levels are determined based upon a completion status of each of the plurality of intermediate goals established for the health goal, the current and continued community activity levels are determined based upon a completion status of each of the plurality of intermediate goals established for the community goal, and the current and continued financial independence levels are determined based upon a completion status of each of the plurality of intermediate goals established for the financial goal.

* * * * *